US011035212B2

(12) United States Patent
Alruwaili et al.

(10) Patent No.: US 11,035,212 B2
(45) Date of Patent: Jun. 15, 2021

(54) STIMULATING U-SHAPE WELLBORES

(71) Applicant: Saudi Arabian Oil Company, Dhahran (SA)

(72) Inventors: Khalid Mohammed M. Alruwaili, Dhahran (SA); Mohamed Nabil Noui-Mehidi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/272,690

(22) Filed: Feb. 11, 2019

(65) Prior Publication Data
US 2020/0256173 A1 Aug. 13, 2020

(51) Int. Cl.
*E21B 43/26* (2006.01)
*E21B 43/114* (2006.01)
*E21B 34/06* (2006.01)

(52) U.S. Cl.
CPC ............ *E21B 43/26* (2013.01); *E21B 43/114* (2013.01); *E21B 34/063* (2013.01)

(58) Field of Classification Search
CPC ....... E21B 43/26; E21B 43/114; E21B 34/063
See application file for complete search history.

(56) References Cited

U.S. PATENT DOCUMENTS

| 2,699,212 A | 1/1955 | Dismukes |
| 3,254,720 A | 8/1966 | Huitt |
| 4,262,745 A * | 4/1981 | Stewart ............... E21B 43/24 166/263 |

(Continued)

FOREIGN PATENT DOCUMENTS

| RU | 2211318-02 | * | 8/2003 | |
| WO | WO-2018174987 A1 | * | 9/2018 | ............ E21B 17/20 |
| WO | WO 2018175394 | | 9/2018 | |

OTHER PUBLICATIONS

Shi et al., "Research and Application of Drilling Technology of Extended-reach Horizontally-intersected Well Used to Extract Coalbed Methane," 2011 Xi'an International Conference on Fine Geological Exploration and Groundwater & Gas Hazards Control in Coal Mines, Procedia Earth and Panetary Science vol. 3, Dec. 2011, 9 pages.

(Continued)

*Primary Examiner* — Aaron L Lembo
(74) *Attorney, Agent, or Firm* — Fish & Richardson P.C.

(57) ABSTRACT

A first fracturing fluid is pumped through a first wellbore at a first pressure. The first wellbore includes a first vertical section and horizontal section having a first end, intersecting from the first vertical section, and a distal end. A second fracturing fluid is pumped through a second wellbore at a second pressure simultaneously while the first fracturing fluid is pumped through the first wellbore. The second wellbore includes a second vertical section that intersects with the distal end of the horizontal section. The first pressure and the second pressure result in the first fracturing fluid and the second fracturing fluid intersecting at a fracture point within the horizontal section at a third pressure. The first fracturing fluid and the second fracturing fluid each experience a respective pressure drop traveling through their respective wellbores to the fracture point/. The respective pressure drops result in the third pressure.

20 Claims, 8 Drawing Sheets

(56) References Cited

U.S. PATENT DOCUMENTS

| | | | | |
|---|---|---|---|---|
| 4,390,067 A * | 6/1983 | Willman | E21B 43/305 | 166/245 |
| 4,662,440 A * | 5/1987 | Harmon | E21B 43/30 | 166/245 |
| 4,683,950 A * | 8/1987 | Lessi | E21B 43/30 | 166/271 |
| 4,687,061 A | 8/1987 | Uhri | | |
| 4,754,808 A * | 7/1988 | Harmon | E21B 43/2405 | 166/245 |
| 4,974,675 A * | 12/1990 | Austin | E21B 43/26 | 166/250.1 |
| 5,016,710 A * | 5/1991 | Renard | E21B 43/16 | 166/245 |
| 5,074,360 A * | 12/1991 | Guinn | E21B 43/17 | 166/245 |
| 5,228,510 A * | 7/1993 | Jennings, Jr. | E21B 43/26 | 166/263 |
| 5,450,902 A * | 9/1995 | Matthews | E21B 43/121 | 166/268 |
| 6,095,244 A * | 8/2000 | Graham | E21B 43/17 | 166/271 |
| 6,119,776 A | 9/2000 | Graham et al. | | |
| 6,425,448 B1 * | 7/2002 | Zupanick | E21B 7/046 | 166/245 |
| 6,488,087 B2 * | 12/2002 | Longbottom | E21B 33/138 | 166/271 |
| 6,729,394 B1 * | 5/2004 | Hassan | E21B 43/17 | 166/245 |
| 7,370,696 B2 * | 5/2008 | Al-Muraikhi | E21B 43/08 | 166/50 |
| 7,419,005 B2 * | 9/2008 | Al-Muraikhi | E21B 43/305 | 166/306 |
| 7,637,316 B2 * | 12/2009 | Best | E21B 41/0042 | 166/245 |
| 8,041,510 B2 * | 10/2011 | Dasgupta | G01V 1/288 | 702/12 |
| 8,490,685 B2 * | 7/2013 | Tolman | E21B 43/267 | 166/52 |
| 8,631,872 B2 | 1/2014 | East | | |
| 9,063,252 B2 * | 6/2015 | Kamal | G01V 11/00 | |
| 9,187,992 B2 * | 11/2015 | Cherian | E21B 43/17 | |
| 10,612,355 B1 | 4/2020 | Alruwaili et al. | | |
| 2008/0264640 A1 | 10/2008 | Eslinger | | |
| 2011/0284214 A1 | 11/2011 | Ayoub et al. | | |
| 2014/0352968 A1 * | 12/2014 | Pitcher | E21B 43/26 | 166/308.1 |
| 2015/0096806 A1 * | 4/2015 | Fonseca Ocampos | E21B 43/25 | 175/53 |
| 2016/0201440 A1 | 7/2016 | Aidagulov | | |
| 2018/0119533 A1 * | 5/2018 | Alhuthali | E21B 41/0035 | |
| 2018/0266183 A1 | 9/2018 | Ayub | | |
| 2019/0195043 A1 * | 6/2019 | Singh | E21B 33/138 | |
| 2019/0218907 A1 * | 7/2019 | Ow | C07D 213/55 | |
| 2020/0024935 A1 | 1/2020 | Eitschberger et al. | | |
| 2020/0024936 A1 | 1/2020 | Chang | | |

OTHER PUBLICATIONS

Xi et al., "Uncertainty Analysis Method for Intersecting Process of U-Shaped Horizontal Wells," Arabian Journal for Science and Engineering, vol. 40, Issue 2, Feb. 2015, 12 pages.

Al-Qahtani et al., "A Semi-Analytical Model for Extended-Reach Wells with Wellbore Flow Splitting; a Production Optimization Scheme," SPE-177931, presented at the Abu Dhabi International Petroleum Exhibition and Conference, Nov. 9-12, 2015, 21 pages.

International Search Report and Written Opinion issued in International Application No. PCT/US2020/107610 dated May 8, 2020, 13 pages.

International Search Report and Written Opinion issued in International Application No. PCT/US2020/017608 dated May 15, 2020, 14 pages.

* cited by examiner

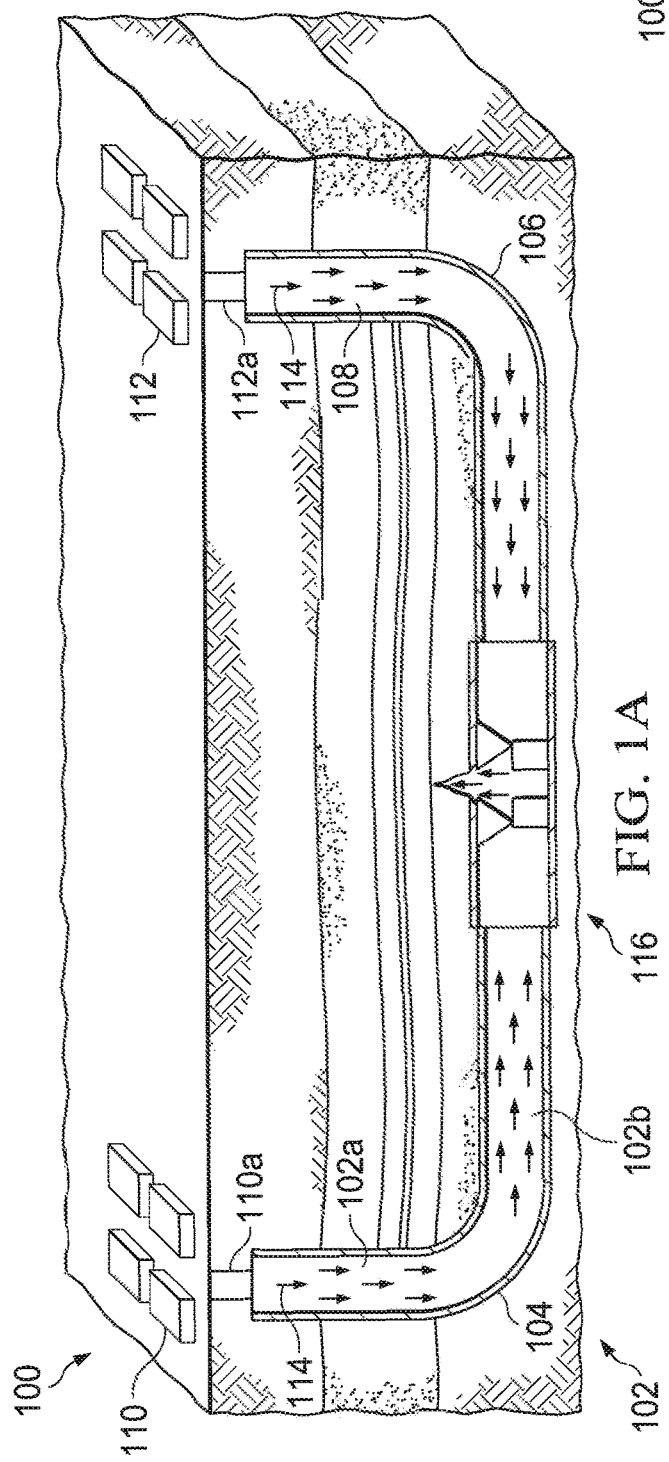
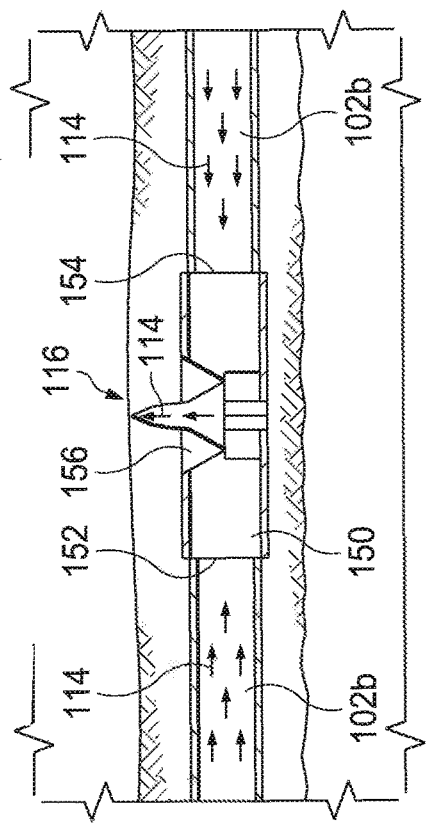
FIG. 1A
FIG. 1B

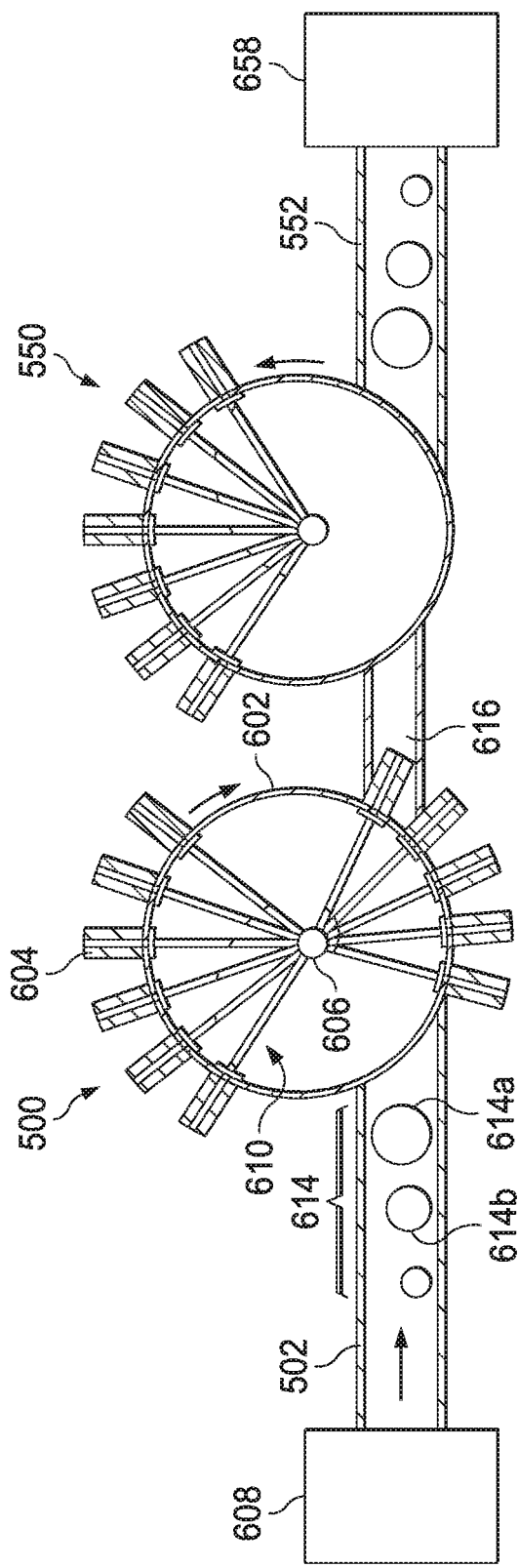
FIG. 6A
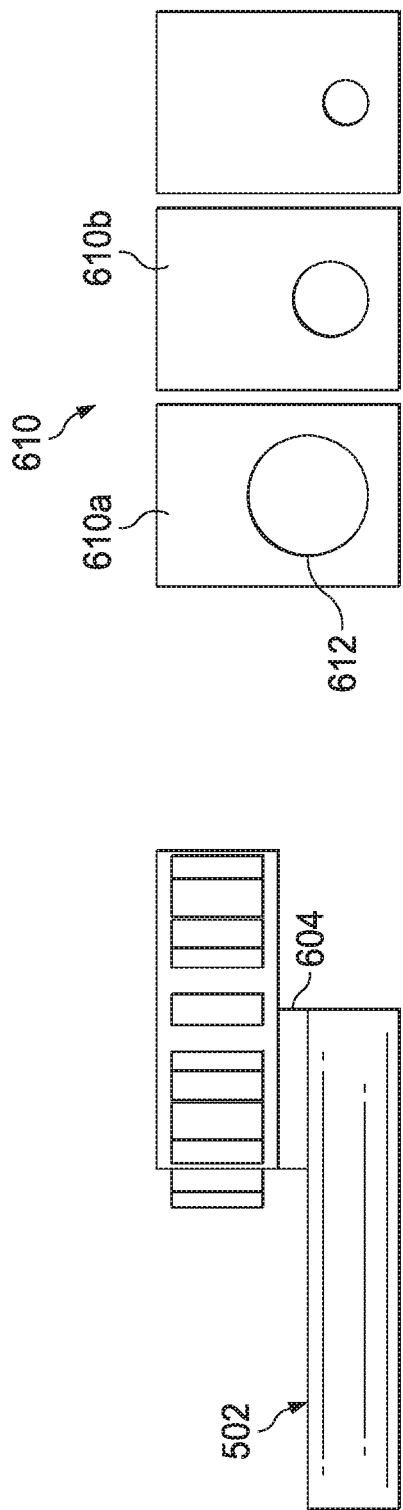
FIG. 6B
FIG. 6C

STIMULATING U-SHAPE WELLBORES

TECHNICAL FIELD

This disclosure describes technologies relating to stimulating U-shaped wellbores.

BACKGROUND

U-shaped wellbores include two vertical wellbores intersecting a horizontal wellbore. The horizontal wellbore, having both a vertical section and a horizontal section, is drilled, and then the vertical wellbore is drilled to intersect with the downhole end, also referred to as the "toe" of the horizontal wellbore. U-shaped wellbores can be useful for increasing production rates because two topside facilities can both produce from the horizontal wellbore.

In hydrocarbon production, wellbores are often fractured by pumping high-pressure fluids via a wellbore into a zone of interest. A zone of interested is typically a section of a geologic formation that has a probability of producing hydrocarbons. The high-pressure fluid has sufficient pressure to exceed the yield-strength of the rock in the geologic formation, causing fracture propagation. The fractures increase a flow area from the geologic formation into the wellbore

SUMMARY

This disclosure describes technologies relating to stimulating U-shaped wellbores.

An example implementation of the subject matter described within this disclosure is a method with the following features. A first fracturing fluid is pumped through a first wellbore at a first pressure. The first wellbore includes a first vertical section and horizontal section having a first end, intersecting from the first vertical section, and a distal end. A second fracturing fluid is pumped through a second wellbore at a second pressure simultaneously while the first fracturing fluid is pumped through the first wellbore. The second wellbore includes a second vertical section that intersects with the distal end of the horizontal section. The first pressure and the second pressure result in the first fracturing fluid and the second fracturing fluid intersecting at a fracture point within the horizontal section at a third pressure. The first fracturing fluid and the second fracturing fluid each experience a respective pressure drop traveling through their respective wellbores to the fracture point/. The respective pressure drops result in the third pressure.

Aspects of the example implementation, which can be combined with the example implementation alone or in combination, include the following. The first pressure is different from the second pressure.

Aspects of the example implementation, which can be combined with the example implementation alone or in combination, include the following. The first wellbore is drilled. The second wellbore is drilled.

Aspects of the example implementation, which can be combined with the example implementation alone or in combination, include the following. The fracture point is substantially halfway through a length of the horizontal section.

Aspects of the example implementation, which can be combined with the example implementation alone or in combination, include the following. The first fracturing fluid and the second fracturing fluid are substantially identical.

Aspects of the example implementation, which can be combined with the example implementation alone or in combination, include the following. A third wellbore with a third vertical section and a second horizontal section intersecting the second vertical section is drilled. A third fracturing fluid is pumped through the third wellbore. The second fracturing fluid is pumped fluid through the second wellbore while simultaneously pumping the third fracturing fluid through the third wellbore.

Aspects of the example implementation, which can be combined with the example implementation alone or in combination, include the following. Prior to pumping fracturing fluid through the first wellbore or the second wellbore, a notch is formed in the horizontal section of the first wellbore with a hydraulic notching tool.

Aspects of the example implementation, which can be combined with the example implementation alone or in combination, include the following. The notch is substantially perpendicular to the least principal stress of the horizontal section.

An example implementation of the subject matter described within this disclosure is a method with the following features. A horizontal section of a wellbore is notched. The notch is substantially perpendicular to the least principal stress of the horizontal section. The horizontal section has a first end, intersecting from a first vertical section, and a distal end. A first fracturing fluid is pumped at a first pressure through a first wellbore with the first vertical section and the horizontal section at a first pressure. A second fracturing fluid is pumped at a second pressure through a second wellbore that intersects with the distal end of the horizontal section of the first wellbore. Pumping the second fracturing fluid occurs simultaneously as pumping fracturing fluid through the first wellbore.

Aspects of the example implementation, which can be combined with the example implementation alone or in combination, include the following. The first pressure is different from the second pressure.

Aspects of the example implementation, which can be combined with the example implementation alone or in combination, include the following. The first pressure and the second pressure result in the first fracturing fluid and the second fracturing fluid from the second wellbore intersecting at a fracture point within the horizontal section at a third pressure. The first fracturing fluid and the second fracturing fluid experience a first pressure drop and a second pressure drop, respectively, while traveling through their respective wellbores to the fracture point.

Aspects of the example implementation, which can be combined with the example implementation alone or in combination, include the following. The fracture point is substantially halfway through a length of the horizontal section.

Aspects of the example implementation, which can be combined with the example implementation alone or in combination, include the following. The first fracturing fluid and the second fracturing fluid are substantially identical.

Aspects of the example implementation, which can be combined with the example implementation alone or in combination, include the following. A third wellbore with a third vertical section and a second horizontal section, the horizontal section intersect with the second wellbore. A third fracturing fluid is pumped through the third wellbore. The second fracturing fluid is pumped through the second wellbore while simultaneously pumping the third fracturing fluid.

An example implementation of the subject matter described within this disclosure is a method with the following features. A first fracturing fluid is pumped at a first pressure through a first wellbore with a vertical section and a horizontal section having a first end, intersecting from the vertical section, and a distal end. A second fracturing fluid is pumped at a second pressure through a second wellbore that intersects with the distal end of the horizontal section. Pumping the second fracturing fluid occurs simultaneously as pumping the first fracturing fluid.

Aspects of the example implementation, which can be combined with the example implementation alone or in combination, include the following. Prior to pumping fracturing fluid through the first wellbore or the second wellbore, a notch is formed in the horizontal section with a hydraulic notching tool.

Aspects of the example implementation, which can be combined with the example implementation alone or in combination, include the following. The notch is substantially perpendicular to the least principal stress of the horizontal section.

Aspects of the example implementation, which can be combined with the example implementation alone or in combination, include the following. The first pressure is different from the second pressure.

Aspects of the example implementation, which can be combined with the example implementation alone or in combination, include the following. The first pressure and the second pressure result in the first fracturing fluid and the second fracturing fluid intersecting at a fracture point within the horizontal section at a third pressure. The first fracturing fluid and the second fracturing fluid experience a first pressure drop and a second pressure drop, respectively, traveling through their respective wellbores to the fracture point.

Aspects of the example implementation, which can be combined with the example implementation alone or in combination, include the following. The fracture point is substantially halfway through a length of the horizontal section.

Aspects of the example implementation, which can be combined with the example implementation alone or in combination, include the following. The first fracturing fluid and the second fracturing fluid are substantially identical.

Aspects of the example implementation, which can be combined with the example implementation alone or in combination, include the following. A third wellbore is formed with a second vertical section and a second horizontal section. The horizontal section intersects with the second wellbore. A third fracturing fluid is pumped through the third wellbore. The second fracturing fluid is pumped through the second wellbore while simultaneously pumping the third fracturing fluid.

Particular implementations of the subject matter described in this disclosure can be implemented so as to realize one or more of the following advantages. Notching parallel to the least principle stress results in an improved fracturing job resulting in greater production rates than those observed with standard fracturing and notching procedures. Stimulation from both sides allows for a smaller footprint at each site for stimulation infrastructure. Multiple production zones can be targeted within a horizontal wellbore. Certain reservoir topologies described herein can have a majority of equipment stay at a single site, reducing logistical issues.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

FIG. 1A is a schematic diagram of a U-shaped wellbore during fracturing operations.

FIG. 1B is a schematic diagram of a fracturing point within the U-shaped wellbore.

FIGS. 6A-6C are schematic diagrams of the notching tool.

Like reference numbers and designations in the various drawings indicate like elements.

DETAILED DESCRIPTION

Figure 2:
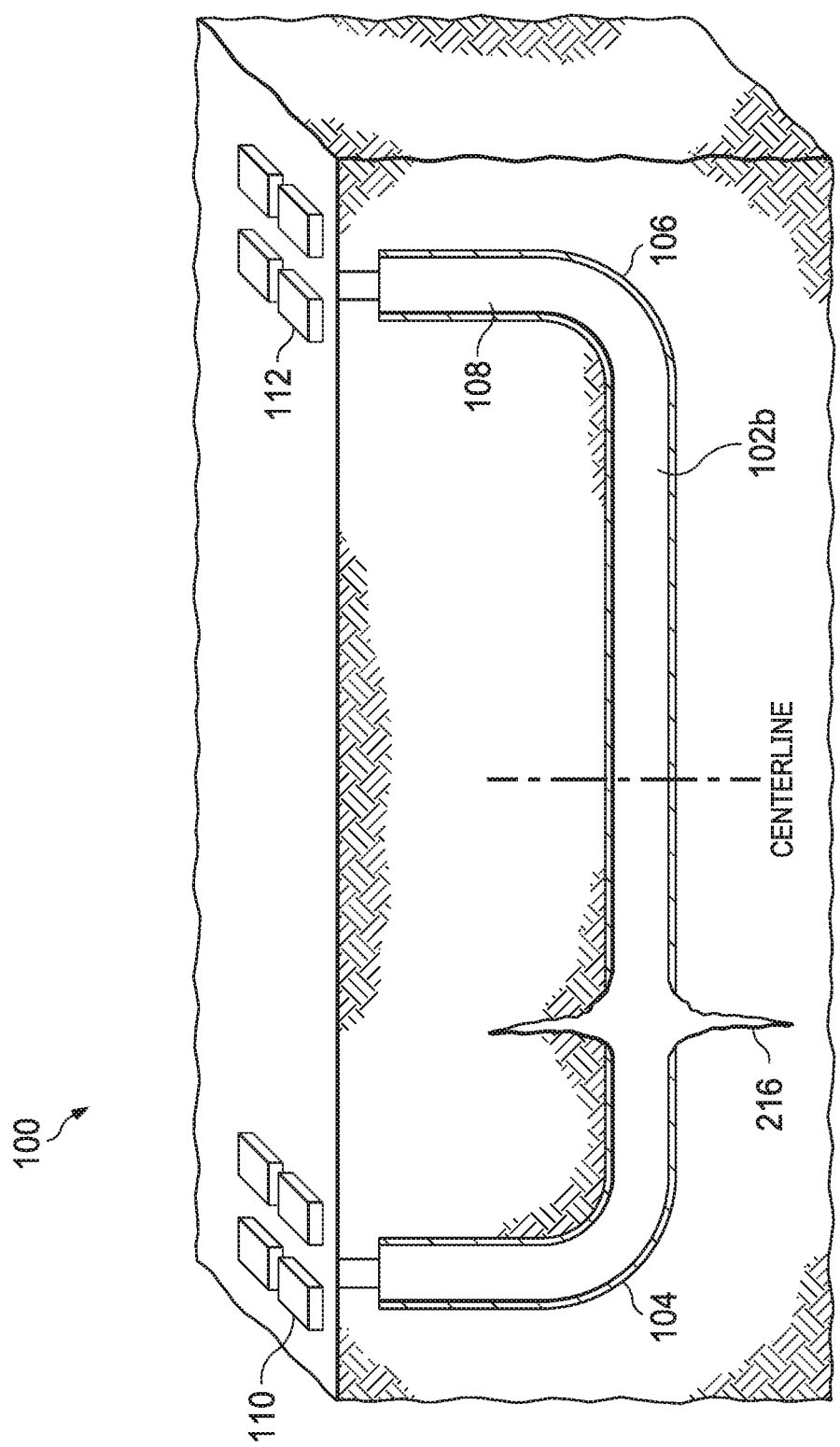
FIG. 2 is a schematic diagram of a U-shaped wellbore with a fracturing point that is offset from the middle of the horizontal section.

This disclosure relates to a method of fracturing a tight (low permeability) geologic reservoir with a U-shaped well, but can also be used for similar hydrocarbon bearing formations. A first wellbore with a vertical section and a horizontal section is drilled from a first location. The first wellbore has a first end at a terranian surface and a second end at a downhole, or distal end, opposite the first end. A second, vertical well is drilled at a second location and intersects with the toe (distal end) of the first wellbore to form the U-shaped wellbore. The horizontal section of the "U" is divided into one or more compartments by retrievable mechanical packers. Fluid pressure is varied from each location depending on the horizontal location of the intended fracture. Fracturing fluid is pumped into the wellbore from topside facilities at both locations (the tops of the "U") to provide the fluid pressure. The various packers used to isolate the horizontal section of the wellbore are configured to receive flow from both directions, and direct the flow into the formation from the wellbore to initiate a fracture.

Alternatively or in addition, multiple horizontal wells can extend from a central vertical wellbore in a spoke-like patter. This implementation enables multiple horizontal sections to be fracked from the central vertical wellbore. Prior to fracturing, either implementation can horizontal wellbores can be notched to assist in fracturing at specified locations.

FIG. 1A is a schematic diagram of a U-shaped wellbore 100 during fracturing operations. The U-shaped wellbore 100 is formed by drilling a first horizontal wellbore 102. The first horizontal wellbore 102 includes a vertical section 102a and a horizontal section 102b. The transition between the vertical section 102a and the horizontal section 102b is referred to as a heel 104. The heel 104 is illustrated as a hard 90° turn, but it can also be a gradual transition between the vertical section 102a and the horizontal section 102b without departing from this disclosure. The distal, or downhole, end of the first horizontal wellbore 102 is referred to as a toe 106. A second wellbore 108 having a vertical section is drilled into the toe 106 to complete the U-shaped wellbore 100. While illustrated as a straight, vertical wellbore, the second wellbore 108 can be slightly deviated without departing from this disclosure. In general, the U-shaped wellbore 100 includes a horizontal section 102b, a first wellbore opening, and a second wellbore opening. A first topside facility 110 can be attached to or be otherwise fluidically coupled to the first wellbore opening, and a second topside facility 112 can be attached to or be otherwise fluidically connected to the second wellbore opening.

The first topside facility 110 and the second topside facility 112 can include fracturing equipment such as manifolds, pumps, mixers, storage tanks, derricks, and other necessary support equipment for fracturing operations. During fracturing operations, fracturing fluid 114 is pumped from the first topside facility 110 and the second topside facility 112 simultaneously towards a fracturing point 116. The fracturing fluid pressure at the first topside facility 110 and the second topside facility 112 are such that the fracturing fluid from both locations is substantially the same pressure once the fluids reach the fracturing point 116. In general, the maximum allowable pressure is governed by the type of completion. For example, the wellbore completion may have a maximum pressure rating of up to 20,000 pounds per square inch (psi) but due to safety factors at the topside facilities, the allowable maximum pressure may reach up to 13,000 psi to 16,000 psi per well. Pumping fracturing fluid 114 from the first topside facility 110 and the second topside facility 112 simultaneously allows for greater flowrates and pressures at the fracture point 116 while maintaining a smaller physical surface footprint at each location.

In some implementations, the first topside facility 110 and the second topside facility 112 each pump a fracturing fluid 114 that is substantially identical within typical mixing tolerances. In some implementations, the first topside facility 110 and the second topside facility 112 each pump a fracturing fluid 114 that are different from one another. For example, fracturing fluid from the first topside facility 110 may include lubricants to reduce the pressure drop to the fracture point 116 if there is a difference in tubing diameter, tubing roughness, or tubing length between the first topside facility 110 and the fracture point 116 in comparison to the second topside facility 112. In some implementations, the fracture point 116 is substantially (within +/−10%) halfway through a length of the horizontal section 102b within typical measurement errors. In some implementations, the pressure of the fracturing fluid at the first topside facility 110 and the second topside facility 112 is substantially identical within standard pressure measurement errors.

FIG. 1B is a schematic diagram of a fracturing point 116 within the U-shaped wellbore 100. At the fracture point 116 within the horizontal section 102b of the wellbore 100, a fracture packer 150 is positioned adjacent to the fracture point 116. The fracture packer 150 includes a first fluid inlet 152 and a second fluid inlet 154. The first fluid inlet 152 receives fracturing fluid 114 from the first topside facility 110, while the second fluid inlet 154 receives fracturing fluid 114 from the second topside facility 112. The fracturing packer 150 then directs the fracturing fluid from both topside facilities out a fracturing nozzle 156 into the geologic formation, fracturing the formation. In some implementations, the fracture point 116 can be notched prior to fracturing to improve fracture propagation. Details with such implementations are described later within this disclosure.

FIG. 2 is a schematic diagram of the U-shaped wellbore 100 with a fracturing point 216 that is substantially offset from the middle of the horizontal section 102b (more than +/−10% from the halfway point). In such implementations, the first pressure and the second pressure result in the first fracturing fluid from the first topside facility 110 and the second fracturing fluid from the second topside facility 112 intersecting at the fracture point 216 within the horizontal section 102b at a third pressure. The first fracturing fluid and the second fracturing fluid experience a first pressure drop and a second pressure drop, respectively, while traveling through their respective wellbores to the fracture point 216. As the distance traveled from each topside facility is different, the first pressure drop and the second pressure drop can be different as well. To compensate for this, the first pressure at the first topside facility is different from the second pressure at the second topside facility. For example, if the fracturing point 216 is closer to the first topside facility, the fracture fluid at the first topside facility may not be at as great a pressure as the fracture fluid at the second topside facility.

Figure 3:
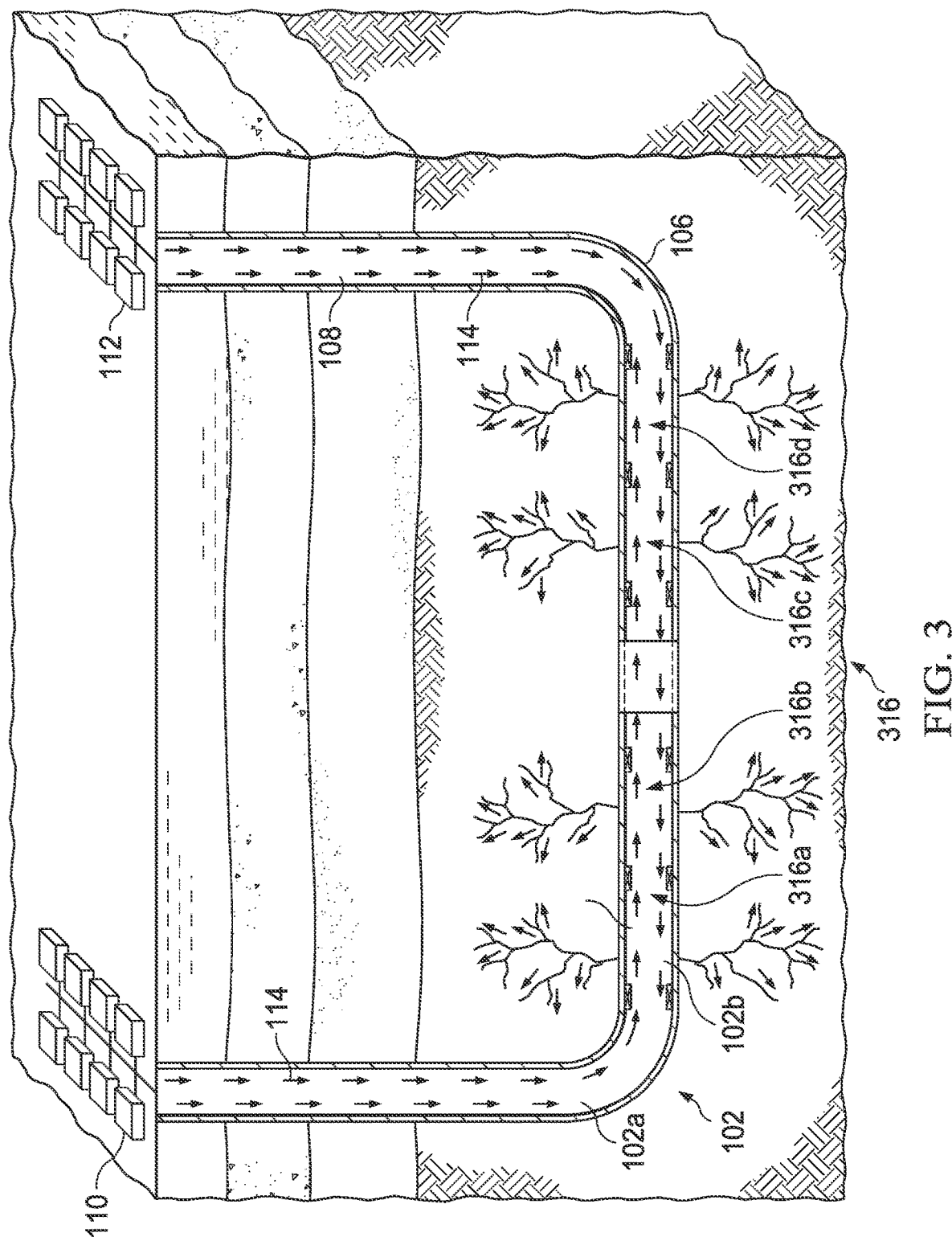
FIG. 3 is a schematic diagram of a U-shaped wellbore with multiple fracturing points.

FIG. 3 is a schematic diagram of the U-shaped wellbore 100 with multiple fracturing points 316. A first fracture point 316a, a second fracture point 316b, a third fracture point 316c, and a fourth fracture point 316d are all located within the horizontal section 102b. While illustrated with four fracture points within the horizontal section 102b, more or less fracture points can be used. Alternatively or in addition, fracture points can exist in the first vertical section 102a or the second vertical wellbore 108 without departing from this disclosure. Regardless of the location of the individual fracture points, fluid is pumped from the first topside facility 110 and the second topside facility 112 simultaneously to the fracturing point of choice. Pressure is regulated separately at the first topside facility 110 and the second topside facility 112 so that pressure of the fracturing fluid 114 from both facilities is at substantially the same pressure at the fracture point of choice. In some implementations, though regulated separately, the pressure at both the first topside facility 110 and the second topside facility 112 can be coordinated. For example, fluid can be pumped from the first topside facility 110 at a first specified pressure simultaneously as fluid is pumped from the second topside facility 112 at a second specified pressure. Both facilities can be aware of the operations occurring at one-another and can adjust operations to coordinate with one another in the event of an unexpected occurrence. In some implementations, the first fracture point 316a, the second fracture point 316b, the third fracture point 316c, and the fourth fracture point 316d are fractured serially. That is, each fracture point is fractured one at a time. In some implementations, multiple fracture points can be fractured simultaneously.

Figure 4:
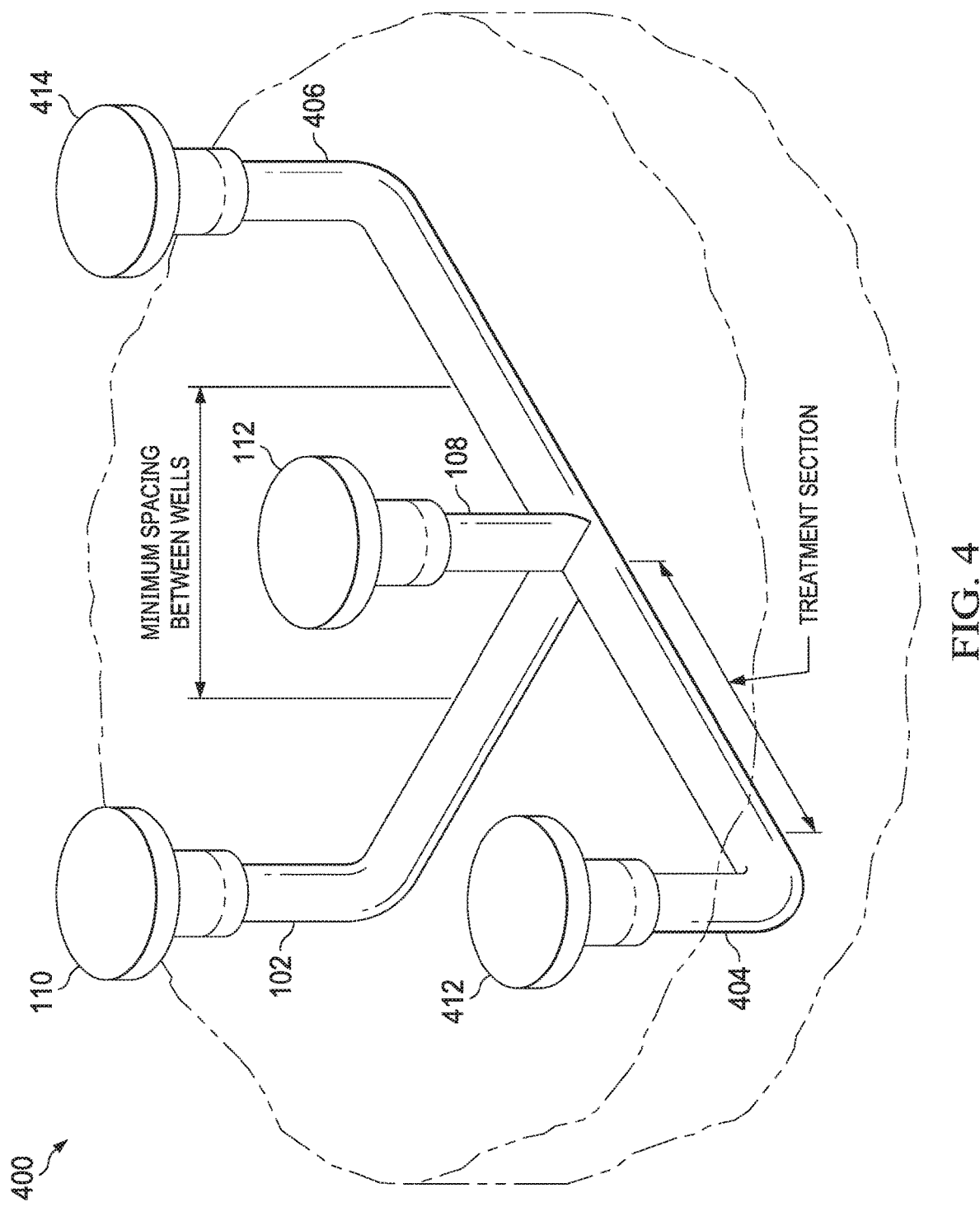
FIG. 4 is a schematic diagram of a production field with multiple U-shaped wellbores sharing a common central vertical wellbore.

FIG. 4 is a schematic diagram of a production field 400 with multiple U-shaped wellbores sharing a common central vertical wellbore, such as vertical wellbore 108. In such implementations, multiple horizontal wellbores, such as the first horizontal wellbore 102, a second horizontal wellbore 404, and a third horizontal wellbore 406 each have a respective vertical section and a respective horizontal section. The vertical wellbore 108 is drilled to intersect with the toe of the first horizontal wellbore 102, the second horizontal wellbore 404, and the third horizontal wellbore 406. Such an arrangement results in a hub-and-spoke arrangement. Fracturing fluid can be pumped from the topside facility 112 into any of the horizontal sections. Each of the additional wellbores has an additional topside facility. For example, a third topside facility 412 is located at the top of the third wellbore 404 and a fourth topside facility 414 is located at the top of the fourth wellbore 406. During fracturing operations, fracturing fluid is pumped from the topside facility 112 and the respective topside facility for a particular horizontal section simultaneously. Multiple fracture points can exist in each horizontal section. Alternatively or in addition, fracture points can be present in any of the vertical wellbore sections. While illustrated with three horizontal wellbores and one vertical wellbore, greater or fewer wellbores can be used. After fracturing operations, the vertical wellbore can be used to produce from or monitor the various horizontal wellbore sections. In some implementations, the fracturing points in the various wellbores can be notched prior to fracturing operations.

Figure 5:
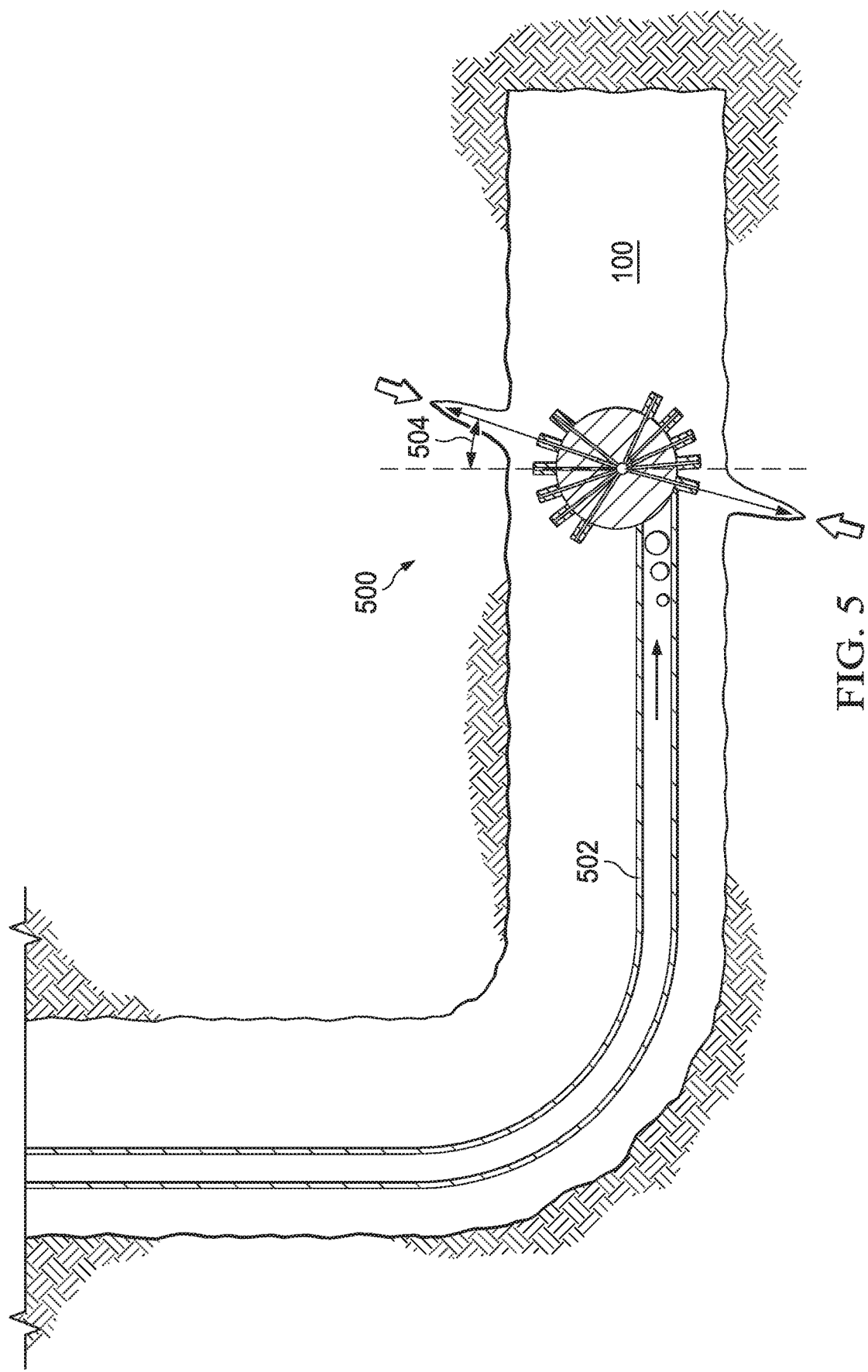
FIG. 5 is a schematic diagram of an example notching tool positioned within the U-shaped wellbore.

As previously described, any of the fracturing points can be notched prior to fracturing. FIG. 5 is a schematic diagram of an example hydraulic notching tool 500 positioned within a U-shaped wellbore, such as U-shaped wellbore 100. The hydraulic notching tool is positioned within the wellbore 100 by a length of coiled tubing 502 extending from a topside facility. The hydraulic notching tool 500 is supplied with hydraulic notching fluid from the topside facility. The hydraulic notching fluid need not be the same as the fracturing fluid. For example, the hydraulic notching fluid can include an abrasive suspended within the hydraulic notching fluid while the fracturing fluid can include proppant suspended in the fracturing fluid. In some implementations, the hydraulic notching fluid is the same as the fracturing fluid. Fluid selection for both fracturing and notching is determined one a case-by-case basis for each individual well based on rock properties, reservoir pressures, and other factors. The hydraulic tool 500 is configured to spray the notching fluid at sufficient pressure to create a notch in the wellbore 100. The pressure required is dependent upon the rock properties at the fracture point. In some implementations, the notch includes a point, corner, or other discontinuity that can create a stress concentration factor. The hydraulic notching tool 500 is configurable in-hole to notch at a specified angle 504. That is, the notching angle 504 can be adjusted after the hydraulic notching tool 500 is at the fracture point. In some implementations, the notching angle 504 is substantially perpendicular (+/−5°) to the least principal stress of the wellbore section to be notched.

FIGS. 6A-6C are schematic diagrams of the hydraulic notching tool 500 and various components. The hydraulic notching tool 500 includes a cylindrical drum 602 with a fluid nozzle 604 along an outer surface of the cylindrical drum 602. The fluid nozzle 604 is configured to be connected to a downhole end of a fluid conduit, such as the coiled tubing 502. The hydraulic notching tool includes multiple actuable fluid nozzles 604 fluidically connected to an interior of the cylindrical drum 602 and positioned around the outer circumference of the cylindrical drum 602. The fluid nozzles 604 are positioned to direct fluid away from the cylindrical drum 602 and towards a wall of the wellbore 100. A rotatable collar 606 is positioned in the center of the cylindrical drum 602. The rotatable collar 606 has an outer surface parallel to the inner surface of the cylindrical drum 602. In some implementations, an isolation packer 608 positioned uphole of the hydraulic notching tool 500. The isolation packer 608 fluidically isolates a section of the wellbore 100 to be notched from a remainder of the wellbore 100.

Multiple sleeve plates 610, one for every fluid nozzle 604, are positioned between the inner surface of the cylindrical drum 602 and the outer surface of the rotatable collar 606. Each of the sleeve plates 610 defines a hole 612 with a diameter smaller than a diameter of a corresponding dropped ball 614. For example, a first sleeve plate 610a has a first hole with a first diameter smaller than a first dropped ball 614a of a first size. A second sleeve plate 610b has a second hole with a second diameter smaller than a second dropped ball 614b of a second size. Each of the sleeve plates 610 are configured to rotate around the rotatable collar 606 when a dropped ball 614 corresponding to one of the sleeve plates 610 is received. Each rotated sleeve plate is configured to direct fluid towards a respective nozzle in response to the rotation. In some implementations, the dropped ball 614 is a dissolvable dropped ball. The dissolvable dropped ball is configured to dissolve at a specified time within a notching fluid. In some implementations, notching fluid flow from the topside facility is timed to correspond with the desired fracture formation.

As previously mentioned, the wellbore can be a U-shaped wellbore, such as the U-shaped wellbore 100, with a topside facility at each end, such as the first topside facility 110 and the second topside facility 112 (FIG. 1). The fluid conduit (coiled tubing 502) can be a first fluid conduit extending from the first topside facility 110. The hydraulic notching tool 500 can be a first hydraulic notching tool 500 and the isolation packer 608 can be a first isolation packer 608. A second fluid conduit 552 can extend from the second topside facility 112. In some implementations, a second well-notching tool 550, identical or similar to the first hydraulic notching tool 500, is fluidically connected to a downhole end of the second fluid conduit 552 within the U-shaped wellbore. A second isolation packer 658 is positioned uphole of the second well-notching tool 550. The second isolation packer 658 fluidically isolates the section of the wellbore 100 to be notched from a remainder of the wellbore 100 toward the second topside facility 122.

In such an implementation, notching fluid can be pumped from both the first topside facility 110 and the second topside facility 112 simultaneously for notching operations. In some implementations, the first fluid notching tool 500 and the second notching tool 550 can be fluidically coupled to one another by a fluid conduit 616. The fluid conduit 616 can be used to equalize pressure between the first fluid notching tool 500 and the second hydraulic notching tool 550. By utilizing pressure from both topside facilities, higher nozzle pressures can be achieved by the first hydraulic notching tool 500 and the second hydraulic notching tool 550. In some implementations, the first fluid notching tool 500 and the second fluid notching tool 550 are substantially similar. For example, the first fluid notching tool and the second fluid notching tool can include a similar outer housing. In some implementations, while the outer housing can be similar, the second fluid notching tool 550 can have a different number of fluid nozzles or fluid nozzles at different angles than the first fluid notching tool 500.

Figure 6D:
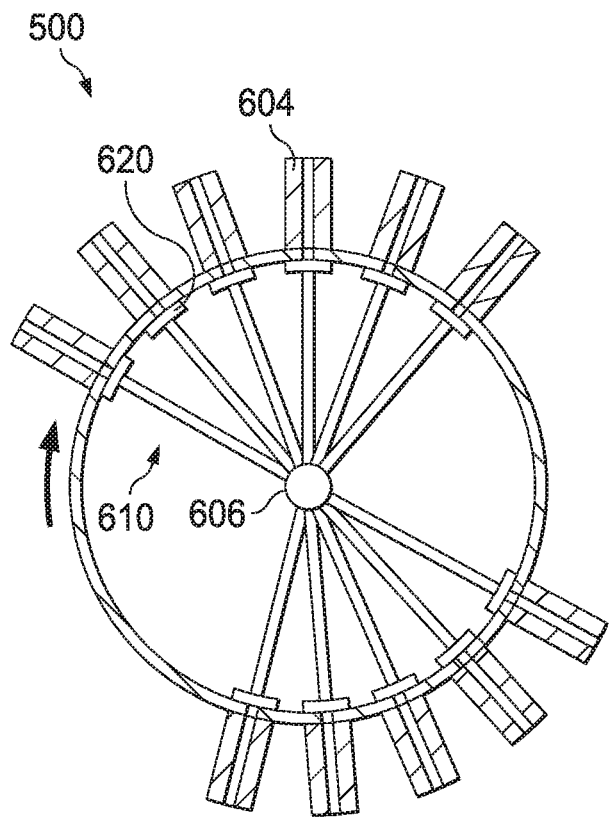
FIGS. 6D-6E are schematic diagrams of the notching tool drum in various stages of operation.
Figure 6E:
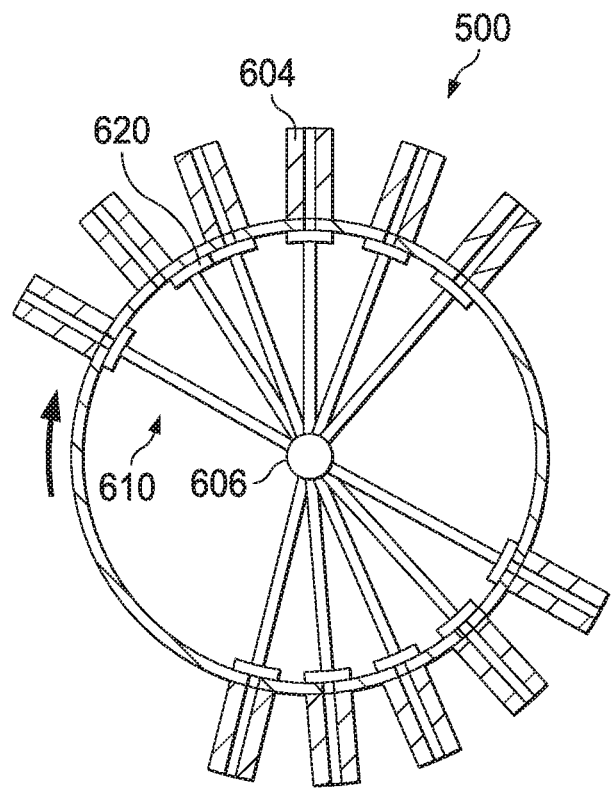

FIGS. 6D-6E are schematic diagrams of the notching tool drum in various stages of operation. Each of the sleeve plates 610 are configured to rotate around the rotatable collar 606 when a dropped ball 614 is received. Each rotated sleeve of the sleeve plates are configured to direct fluid towards a respective nozzle in response to the rotation. For example, as shown in FIG. 6D, the sleeve plates 610 are in a first position. Each sleeve plate is coupled to a gate 620 across each of the corresponding nozzles 604. In the first position, each of the sleeve plates 610 holds their respective gates 620 in a closed position. FIG. 6E shows an gate 620 in an open position. The gate 620 is moved to an open position once the corresponding sleeve plate 610 has received a ball corresponding to that sleeve plate 610. The pressure build-up caused by the ball 614 being seated on the respective sleeve plate 610 causes the sleeve plate 610 and the corresponding gate 620 to move.

Figure 7:
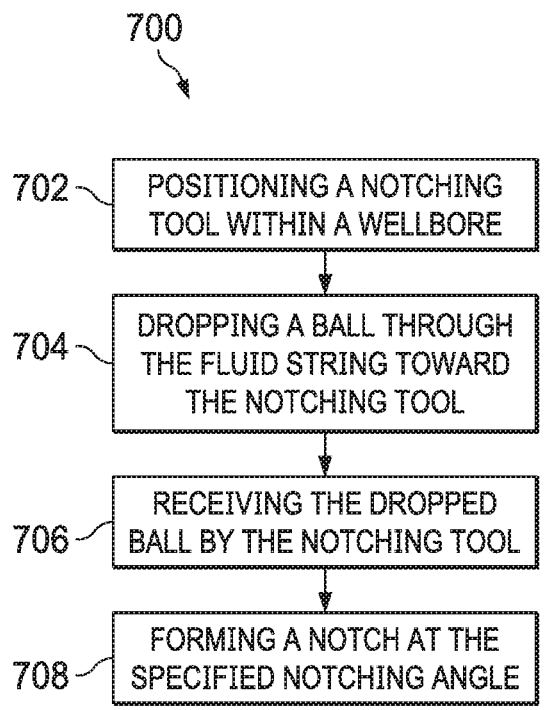
FIG. 7 is a flowchart of an example method that can be used with aspects of this disclosure.

FIG. 7 is a flowchart of an example method 700 for notching a wellbore that can be used with aspects of this disclosure. At 702, a notching tool, such as the notching tool 500, is positioned within a wellbore at a distal (downhole) end of a fluid string, such as the coiled tubing 502. At 704, a ball is dropped through the fluid string toward the notching tool. The dropped ball is sized to trigger a specified notching angle. In some implementations, prior to notching the wellbore, a log of the wellbore is taken to determine an angle of the least principle stress within the wellbore. In some implementations, the specified notching angle is substantially perpendicular (+/−5°) to the least principal stress of the wellbore. At 706, the dropped ball is received by the notching tool. In some implementations, receiving the dropped ball by the notching tool includes receiving the dropped ball by a sleeve plate within the notching tool. The sleeve plate receiving the dropped ball has a hole with a smaller diameter than the received dropped ball. At 708, a notch is formed at the specified notching angle. Forming the notch can include actuating the sleeve plate in response to receiving the dropped ball, and directing fluid through a nozzle that corresponds to the actuated sleeve plate. In some implementations, the dropped ball is a dissolvable dropped ball configured to dissolve after a pre-determined amount of time. In some implementations, the amount of time to notch is controlled by ceasing the flow of notching fluid from the topside facility at a specified time. The amount of time required to create the notch is dependent on pressures and flow rates of the notching fluid, and rock properties at the fracture point.

After the notch has been formed, the hydraulic notching tool is removed from the wellbore. Fracturing fluid can be pumped through the wellbore toward the notch once the hydraulic notching tool has been removed. In some implementations, the hydraulic tool can make multiple notches before being removed from the wellbore. In some implementations, multiple hydraulic notching tools can be used within a single wellbore simultaneously.

Figure 8:
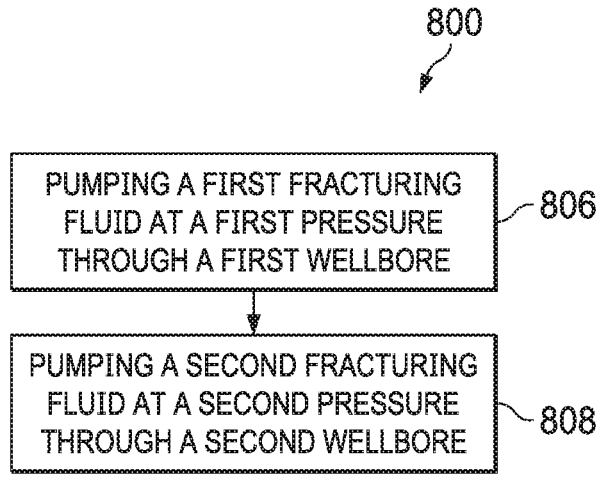
FIG. 8 is a flowchart of an example method that can be used with aspects of this disclosure.

FIG. 8 is a flowchart of an example method 800 that can be used with aspects of this disclosure. A first wellbore with a first vertical section and horizontal section having a first end, intersecting from the first vertical section, and a distal end, is drilled. A second wellbore having a second vertical section that intersects with the distal end of the horizontal section is drilled. At 806, a first fracturing fluid is pumped at a first pressure through a first wellbore with a vertical section and a horizontal section having a first end, intersecting from the vertical section, and a distal end. At 808, a second fracturing fluid is pumped at a second pressure through a second wellbore that intersects with the distal end of the horizontal section. Pumping the second fracturing fluid occurs simultaneously as pumping the first fracturing fluid. In some implementations, the fracture point is halfway through a length of the horizontal section. In some implementations, the first fracturing fluid and the second fracturing fluid are substantially identical.

In some instances, the first pressure is different from the second pressure. In general, the first pressure and the second pressure result in the first fracturing fluid and the second fracturing fluid intersecting at a fracture point within the horizontal section at a third pressure. The first fracturing fluid and the second fracturing fluid experience a first pressure drop and a second pressure drop, respectively, while traveling through their respective wellbores to the fracture point. Such a difference in pressure drop can occur when the fracture point is closer to one topside facility than the other. In some implementations, a third wellbore with a second vertical section and a second horizontal section intersects with the second wellbore. In such implementations, a third fracturing fluid can be pumped through the third wellbore. In such an implementation, the second fracturing fluid is pumped through the second wellbore while simultaneously pumping the third fracturing fluid.

In some implementations, regardless of where the fracture point is located, the fracture point can be notched prior to pumping fracturing fluid through the first wellbore or the second wellbore, for example, using method 700. While previously described as notching with a hydraulic notching tool, other notching tools can be used without departing from this disclosure. In some implementations, such a notch can be substantially perpendicular (+/−5°) to the least principal stress of the horizontal section.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations previously described should not be understood as requiring such separation in all implementations, and it should be understood that the described components and systems can generally be integrated together in a single product or packaged into multiple products. For example, the hydraulic notching tools described herein can be applied to other, non-U-shaped wellbores. Alternatively or in addition, other notching tools can be used in a U-shaped wellbore to achieve similar results prior to fracturing. For example, other hydraulic tool configurations can be used, laser notching tools can be used, or mechanical notching tools can be used with similar results.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
 positioning a fracturing packer that comprises a fracturing nozzle intersecting at a fracture point of a first wellbore within a geologic formation and a second wellbore within a geologic formation, wherein the first wellbore comprises a first vertical section and horizontal section having a first end and a length, intersecting from the first vertical section, and a distal end, wherein the second wellbore comprises a second vertical section that intersects with the distal end of the horizontal section;

pumping a first fracturing fluid through the first wellbore at a first pressure;

pumping a second fracturing fluid through the second wellbore at a second pressure simultaneously while the first fracturing fluid is pumped through the first wellbore; and flowing the first fracturing fluid and the second fracturing fluid through the fracturing nozzle onto the geologic formation at the fracture point, wherein the first pressure and the second pressure result in the first fracturing fluid and the second fracturing fluid intersecting at a fracture point within the horizontal section at a third pressure, the first fracturing fluid and the second fracturing fluid each experiencing a respective pressure drop traveling through their respective wellbores to the fracture point, the respective pressure drops resulting in the third pressure, the third pressure being great enough to exceed a yield-strength of rock within the geologic formation at the fracture point.

2. The method of claim 1, wherein the first pressure is different from the second pressure.

3. The method of claim 1, further comprising:
drilling the first wellbore; and
drilling the second wellbore.

4. The method of claim 1, wherein the fracture point is substantially halfway through the length of the horizontal section.

5. The method of claim 1, wherein the first fracturing fluid and the second fracturing fluid are substantially identical.

6. The method of claim 1, wherein a third wellbore with a third vertical section and a second horizontal section intersecting the second vertical section are within the geologic formation, the method further comprising:
pumping a third fracturing fluid through the third wellbore; and
pumping the second fracturing fluid through the second wellbore while simultaneously pumping the third fracturing fluid through the third wellbore.

7. The method of claim 1, further comprising:
prior to pumping fracturing fluid through the first wellbore or the second wellbore, forming a notch in the horizontal section of the first wellbore with a hydraulic notching tool.

8. The method of claim 7, wherein the notch is substantially perpendicular to a least principal stress of the horizontal section.

9. A method comprising:
positioning a fracturing packer that comprises a fracturing nozzle intersecting at a fracture point of a first wellbore within a geologic formation and a second wellbore within a geologic formation, wherein the first wellbore comprises a first vertical section and horizontal section having a first end and a length, intersecting from the first vertical section, and a distal end, wherein the second wellbore comprises a second vertical section that intersects with the distal end of the horizontal section;
notching a horizontal section of the first wellbore with the first vertical section and the horizontal section to form a notch that is substantially perpendicular to a least principal stress of the horizontal section, the horizontal section having a first end, intersecting from a first vertical section, and a distal end;
pumping a first fracturing fluid, at a first pressure, through the first wellbore; and
pumping a second fracturing fluid, at a second pressure, through the second wellbore; and
flowing the first fracturing fluid and the second fracturing fluid through the fracturing nozzle onto the geologic formation at the fracture point, wherein the first pressure and the second pressure result in the first fracturing fluid and the second fracturing fluid from the second wellbore intersecting at a fracture point within the horizontal section at a third pressure, the third pressure being great enough to exceed a yield-strength of rock within the geologic formation at the fracture point, the first fracturing fluid and the second fracturing fluid experiencing a first pressure drop and a second pressure drop, respectively, while traveling through their respective wellbores to the fracture point.

10. The method of claim 9, wherein the first pressure is different from the second pressure.

11. The method of claim 9, wherein the fracture point is substantially halfway through a length of the horizontal section.

12. The method of claim 9, wherein the first fracturing fluid and the second fracturing fluid are substantially identical.

13. The method of claim 9, wherein a third wellbore with a third vertical section and a second horizontal section, the second horizontal section intersecting with the second wellbore, the method further comprising:
pumping a third fracturing fluid through the third wellbore; and
pumping the second fracturing fluid through the second wellbore while simultaneously pumping the third fracturing fluid.

14. A method comprising:
positioning a fracturing packer that defines a fracturing nozzle intersecting at a fracture point of a first wellbore and within a geologic formation and a second wellbore within a geologic formation, wherein the first wellbore comprises a first vertical section and horizontal section having a first end and a length, intersecting from the first vertical section, and a distal end, wherein the second wellbore comprises a second vertical section that intersects with the distal end of the horizontal section;
pumping a first fracturing fluid at a first pressure through the first wellbore;
pumping a second fracturing fluid at a second pressure through the second wellbore, wherein pumping the second fracturing fluid occurs simultaneously as pumping the first fracturing fluid; and
flowing the first fracturing fluid and the second fracturing fluid through the fracturing nozzle onto the geologic formation at the fracture point, wherein the first pressure and the second pressure result in the first fracturing fluid and the second fracturing fluid intersecting at a fracture point within the horizontal section at a third pressure, the third pressure being great enough to exceed a yield-strength of rock within the geologic formation at the fracture point, the first fracturing fluid and the second fracturing fluid experiencing a first pressure drop and a second pressure drop, respectively, traveling through their respective wellbores to the fracture point.

15. The method of claim 14, further comprising:
prior to pumping fracturing fluid through the first wellbore or the second wellbore, forming a notch in the horizontal section with a hydraulic notching tool.

16. The method of claim 15, wherein the notch is substantially perpendicular to a least principal stress of the horizontal section.

17. The method of claim 14, wherein the first pressure is different from the second pressure.

18. The method of claim 14, wherein the fracture point is substantially halfway through a length of the horizontal section.

19. The method of claim 14, wherein the first fracturing fluid and the second fracturing fluid are substantially identical.

20. The method of claim 14, wherein a third wellbore with a second vertical section and a second horizontal section, the second horizontal section intersecting with the second wellbore, the method further comprising:
pumping a third fracturing fluid through the third wellbore; and
pumping the second fracturing fluid through the second wellbore while simultaneously pumping the third fracturing fluid.

\* \* \* \* \*